S. R. OPPENHEIM.
PROCESS FOR EXTRACTING POTASH AND OTHER SUBSTANCES FROM KELP.
APPLICATION FILED OCT. 12, 1914.
1,141,482. Patented June 1, 1915.
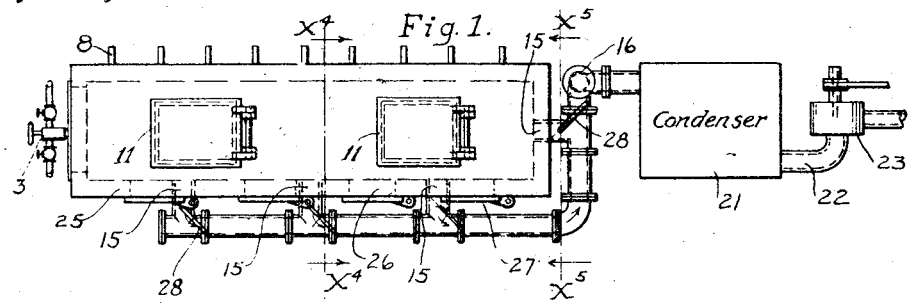
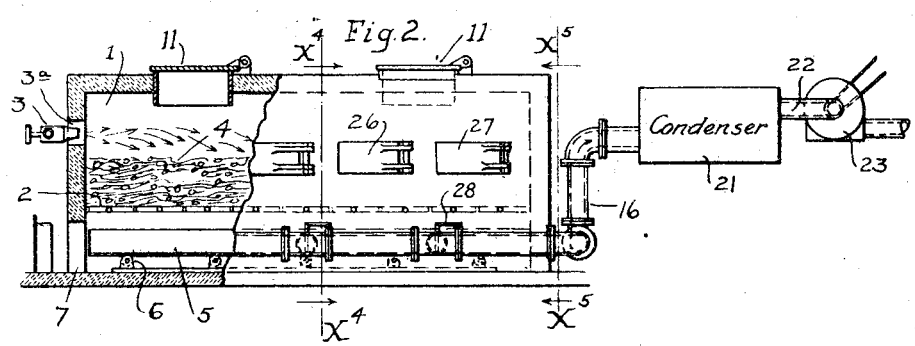
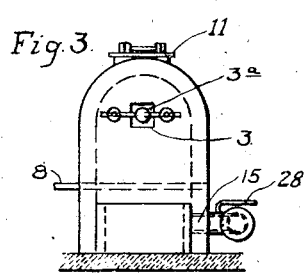 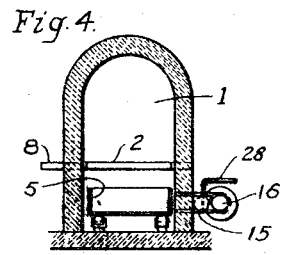 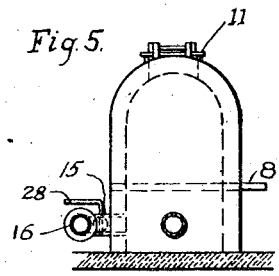
Witnesses:
Inventor:
Simon Rudolph Oppenheim
By Albert H. Merrill
atty.

UNITED STATES PATENT OFFICE.

SIMON RUDOLPH OPPENHEIM, OF LONG BEACH, CALIFORNIA, ASSIGNOR OF ONE-FOURTH TO JULIUS REINHAUS, OF SANTA ANA, CALIFORNIA.

PROCESS FOR EXTRACTING POTASH AND OTHER SUBSTANCES FROM KELP.

1,141,482.      Specification of Letters Patent.      Patented June 1, 1915.

Application filed October 12, 1914. Serial No. 866,398.

*To all whom it may concern:*

Be it known that I, SIMON RUDOLPH OPPENHEIM, a citizen of the United States, residing at Long Beach, California, have invented a new and useful Improvement in Processes for Extracting Potash and other Substances from Kelp, of which the following is a specification.

The improvement of this invention resides in the production of the charred kelp from which the potash is obtained.

One of the objects of this invention is to provide for charring the kelp more quickly and at less expenditure of fuel. A 1000 lbs. charge of kelp when treated by this process may be reduced to a charred condition in from 45 minutes to one hour. The same charge treated by the old method is apt to require as long as 48 hours treatment in the furnace. This method, for a charge of 1000 lbs. uses about three gallons of oil for fuel; the old method uses about thirty gallons of oil for the same charge.

Another object is to reduce the kelp to a charred condition in such a manner as to prevent any waste of potash salts or of other salts. The changing into carbonates of the salts present is almost entirely avoided by reason of the incomplete combustion of this process, the temperature of the burning mass being kept so low that no volatilization or decomposition will take place. The average temperature of the burning kelp within the furnace is preferably kept at about 350° C.

Still another object of this invention is to treat the kelp in such a manner that the residue left after the potash has been leached out of the charred mass, will have a greater commercial value than the residue after charring, or attempting to char, the charge by processes now in use. The residue left after leaching the char produced by this process consists of a pure vegetable carbon which can be used (1) for filtering and deodorizing purposes; (2) medicinal purposes, for example, carbon tablets; (3) carbon of arc lamps; (4) making paint and drawing ink; and (5) correcting soils by furnishing elements necessary to plant growth.

By the old method the residue consists of nothing but useless ashes and clinkers; the residue left after this process has a commercial value of about ten dollars per ton.

In carrying out this improved process a down-draft furnace of any convenient design may be used, one or more burners being located above the dried kelp which is preferably placed in a thick stratum, forming a charge of say one thousand pounds in weight. Suitable means are employed to force the draft down through the charge in such a manner that, after the upper portion of the charge has been ignited by the burner, the ignited area will spread toward the lower portion of the charge until the whole becomes a glowing mass. But, although the carrying out of this process does not depend upon the design of the furnace chamber, yet it is necessary that a furnace be employed provided with one or more injector burners adapted to project a flame directly upon the surface of the kelp.

In the accompanying drawings is illustrated a furnace of a pattern preferred for use in carrying out this process.

Referring to said drawings, Figure 1 is a plan view of said furnace. Fig. 2 is a side elevation of said furnace, a portion of the wall being broken away to show interior construction. Fig. 3 is an elevation of the left end of the furnace shown in Figs. 1 and 2. Fig. 4 is a cross section on line $x^4$—$x^4$ of Figs. 1 and 2. Fig. 5 is a cross section on line $x^5$—$x^5$ of Figs. 1 and 2.

Referring in detail to the drawings, within the furnace chamber 1 is located a series of tilting grates 2, which may extend over substantially the entire transverse area of the furnace. Considerably above said grates 2 at the front end of the furnace, is located an injection oil burner 3 surrounded by burner opening $3^a$, the charge of kelp 4 being placed upon said grates 2. Below said grates is located an elongated receiving pan 5, which is preferably mounted upon rollers 6 in order that said pan may be readily withdraw through the door 7. Each of the grates 2 is provided with an operating arm or shaft 8 which has a squared end extending through the furnace wall, as shown in Fig. 1, in order that the several grates may be tilted by a suitable tool. In the top of the furnace are the doors or covers 11 which open to provide for the insertion of the charge 4.

Near the bottom of the furnace chamber 1 are a plurality of laterally extending flues 15 which lead into a main flue 16 that communicates with a condenser 21, there being an outlet flue 22 between said condenser and the fan 23 to withdraw the air from the furnace by the way of the condenser, thus creating a down-draft through the furnace chamber 1.

In the lateral walls 25 of the furnace are openings 26 closed by doors 27. These openings 26 enable the operator to insert an iron rake or tool to stir the charge of kelp being charred.

The draft of the furnace may be regulated by means of the dampers 28.

In operation the top doors 11 of the furnace are opened and the charge of dried kelp inserted thereat until a thick layer of the kelp 4 is deposited upon the series of grates 2. The doors 11 are then closed and the burner 3 ignited. The fan 23 being put into operation at this time, the flame of the burner 3 will be deflected against the charge of kelp 4, thereby igniting the upper portion of the charge at a point near the burner. After the burner has been in operation about ten minutes, if a proper draft has been maintained, the entire mass of kelp will be in a glowing condition. The next step in the process is to shut off the burner and continue the combustion by the downward draft until the whole mass of kelp is charred, but no portion thereof incinerated. In order to prevent undue heating of any portion of the mass, an operator will open one of the lateral doors 27, inserting a suitable tool, and stir the kelp throughout the portion of the charge near said door and then will immediately close the door, but will proceed to open another door and stir the kelp likewise, thus proceeding as may be necessary to properly stir the whole charge until the process is completed. After the entire mass has become charred the grates 2 will be tilted thus depositing the charred product into the pan 5 for removal from the furnace.

The object of igniting the kelp layer from the upper surface and maintaining a down draft therethrough is to prevent the moisture from accumulating in the center of the layer, which experience has shown, extinguishes the glowing portion of the mass before the entire layer becomes charred.

Owing to the cooling effect of the moisture below the flame and to the fact the flame of the burner is only projected against the kelp for about ten minutes, the walls of the furnace do not become excessively hot and there is no danger of heating any portion of the layer above 350 degrees centigrade. Therefore there is no danger of the chlorids being decomposed into chlorin gas which would be apt to produce an explosion.

I claim:

1. The process of charring dried kelp for the purpose of extracting potash and other salts, which consists in placing the charge in a horizontal layer, applying directly to the top of said layer a flame to ignite to a blaze the upper portion thereof, and then extinguishing the flame and allowing the blazing portion of the kelp to subside to a glowing condition, and thus continuing the combustion by means of a downward draft until the whole charge is charred, but not incinerated.

2. The process of charring dried kelp for the purpose of extracting potash and other salts, which consists in placing the kelp in a substantially horizontal layer, applying to the top of said layer a direct flame to ignite the upper portion thereof, continuing the application of said flame until a considerable portion of the kelp contiguous thereto is converted to a glowing condition, then discontinuing said flame, the walls of the furnace being maintained in a relatively cool condition, then continuing the down draft of the furnace until the whole layer of kelp is charred but not incinerated.

3. The process of charring dried kelp, which consists in placing the char in a specially constructed down draft furnace, then directing against the upper portion of the kelp mass a flame to heat such portion sufficiently to bring the same to a glowing condition, then maintaining a down draft to draw the moisture away from said glowing portion of the kelp and increasing the glowing area as the moisture is withdrawn from beneath the same, until the entire mass is properly charred, the heat within all portions of the furnace being constantly maintained at a temperature less than 350 degrees centigrade.

In testimony whereof I have hereunto signed my name in the presence of two subscribing witnesses at Los Angeles, in the county of Los Angeles and State of California, this fifth day of October, 1914.

SIMON RUDOLPH OPPENHEIM.

Witnesses:
ALBERT H. MERRILL,
M. JENNIE CUTSHAW.